(12) United States Patent
Fukatsu et al.

(10) Patent No.: US 10,046,957 B2
(45) Date of Patent: Aug. 14, 2018

(54) INDUSTRIAL VEHICLE

(71) Applicant: KABUSHIKI KAISHA TOYOTA JIDOSHOKKI, Kariya-shi, Aichi-ken (JP)

(72) Inventors: Fumihiro Fukatsu, Aichi-ken (JP); Takaaki Takenaka, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/014,650

(22) Filed: Feb. 3, 2016

(65) Prior Publication Data
US 2016/0221809 A1 Aug. 4, 2016

(30) Foreign Application Priority Data

Feb. 4, 2015 (JP) .................................. 2015-020136

(51) Int. Cl.
*B62D 49/08* (2006.01)
*B66F 9/075* (2006.01)
*E02F 9/18* (2006.01)

(52) U.S. Cl.
CPC ........ *B66F 9/07572* (2013.01); *B62D 49/085* (2013.01); *B66F 9/07554* (2013.01); *E02F 9/18* (2013.01)

(58) Field of Classification Search
CPC ............. B66F 9/07572; B66F 9/07554; B62D 49/085; E02F 9/18
See application file for complete search history.

(56) References Cited

U.S. PATENT DOCUMENTS

| | | | | |
|---|---|---|---|---|
| 2,398,498 A | * | 4/1946 | Funk | B62D 7/04 180/252 |
| 2,928,487 A | * | 3/1960 | Bobard | B60B 11/00 180/21 |
| 3,029,088 A | | 4/1962 | Loef | |
| 3,693,746 A | * | 9/1972 | Yamamoto | B60G 3/225 180/360 |
| 3,827,517 A | * | 8/1974 | Williamson | B62D 7/04 180/21 |
| 4,318,450 A | * | 3/1982 | Griesenbrock | B60K 1/02 180/212 |

(Continued)

FOREIGN PATENT DOCUMENTS

| | | |
|---|---|---|
| DE | 2658696 A1 | 6/1978 |
| GB | 2347132 A | 8/2000 |

(Continued)

OTHER PUBLICATIONS

Communication dated Jun. 28, 2016, from the European Patent Office in counterpart European Application No. 16152346.9.

(Continued)

*Primary Examiner* — Frank Bennett Vanaman
(74) *Attorney, Agent, or Firm* — Sughrue Mion, PLLC

(57) ABSTRACT

An industrial vehicle including a frame, a counterweight connected to a rear part of the frame, and a drive device disposed in a lower position of the counterweight to drive rear wheels. The counterweight has an opening extending in a vertical direction. At least part of the drive device is disposed immediately below the opening.

6 Claims, 7 Drawing Sheets

(56) References Cited

U.S. PATENT DOCUMENTS

| | | | | |
|---|---|---|---|---|
| 4,359,127 A * | 11/1982 | Arnold | B62D 5/09 180/252 |
| 4,580,811 A * | 4/1986 | Wykhuis | B62D 49/085 280/759 |
| 5,590,735 A * | 1/1997 | Cartier | B60B 33/045 16/19 |
| 6,491,127 B1 * | 12/2002 | Holmberg | B60K 7/0007 180/21 |
| 7,861,820 B1 * | 1/2011 | Goodwin | B62D 7/09 180/408 |
| 2001/0013692 A1 * | 8/2001 | Murase | B60G 3/00 280/124.1 |
| 2004/0188994 A1 | 9/2004 | Uematsu et al. | |
| 2009/0039681 A1 * | 2/2009 | Bogelein | B66F 9/06 296/203.01 |
| 2010/0156079 A1 * | 6/2010 | Nakashima | B60K 11/06 280/755 |
| 2011/0108337 A1 | 5/2011 | Uno | |

FOREIGN PATENT DOCUMENTS

| | | |
|---|---|---|
| JP | 62-156088 U | 10/1987 |
| JP | 04-106100 A | 4/1992 |
| JP | 2536305 B2 | 7/1996 |
| JP | 10-81495 A | 3/1998 |

OTHER PUBLICATIONS

Communication dated Nov. 23, 2016, from the Intellectual Property Office of Taiwan in counterpart application No. 105103421.
Communication dated Jul. 20, 2017 from the State Intellectual Property Office of the P.R.C. in counterpart Application No. 201610068701.8.

* cited by examiner

INDUSTRIAL VEHICLE

BACKGROUND OF THE INVENTION

The present invention relates to an industrial vehicle.

Japanese Patent Application Publication No. 10-81495 discloses a forklift truck as an industrial vehicle. The forklift truck includes a frame, a counterweight, and a drive device. The frame is disposed at a lower part of the forklift truck and extends in the front and rear direction of the forklift truck. The counterweight is connected to the rear part of the frame. The counterweight is substantially of a rectangular shape and extends toward an upper part of the forklift truck. The drive device is connected to the counterweight and disposed at a lower part of the forklift truck. The drive device includes a rear axle and a steering shaft and drives the forklift truck.

The counterweight that is connected to the rear part of the forklift truck as a weight prevents the rear wheels of the traveling forklift truck from being lifted off from the ground because of weight of a load to be carried.

The drive device that plays an important role for traveling of an industrial vehicle needs periodical maintenance work. In a forklift truck in which the drive device is disposed at a lower part of the counterweight, the drive device needs to be removed from the counterweight for the maintenance work. Since the counterweight is heavy, the removal of the drive device from the counterweight and hence the maintenance work of the drive device is hard and difficult.

The present invention which has been made in light to the above problems is directed to providing an industrial vehicle that facilitates the maintenance work of the drive device of the industrial vehicle.

SUMMARY OF THE INVENTION

In accordance with one aspect of the present invention, there is provided an industrial vehicle including a frame, a counterweight connected to a rear part of the frame, and a drive device disposed in a lower position of the counterweight to drive rear wheels. The counterweight has an opening extending in a vertical direction. At least part of the drive device is disposed immediately below the opening.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe a towing tractor according to an embodiment of the present invention with reference to FIGS. 1 through 7.

Figure 1:
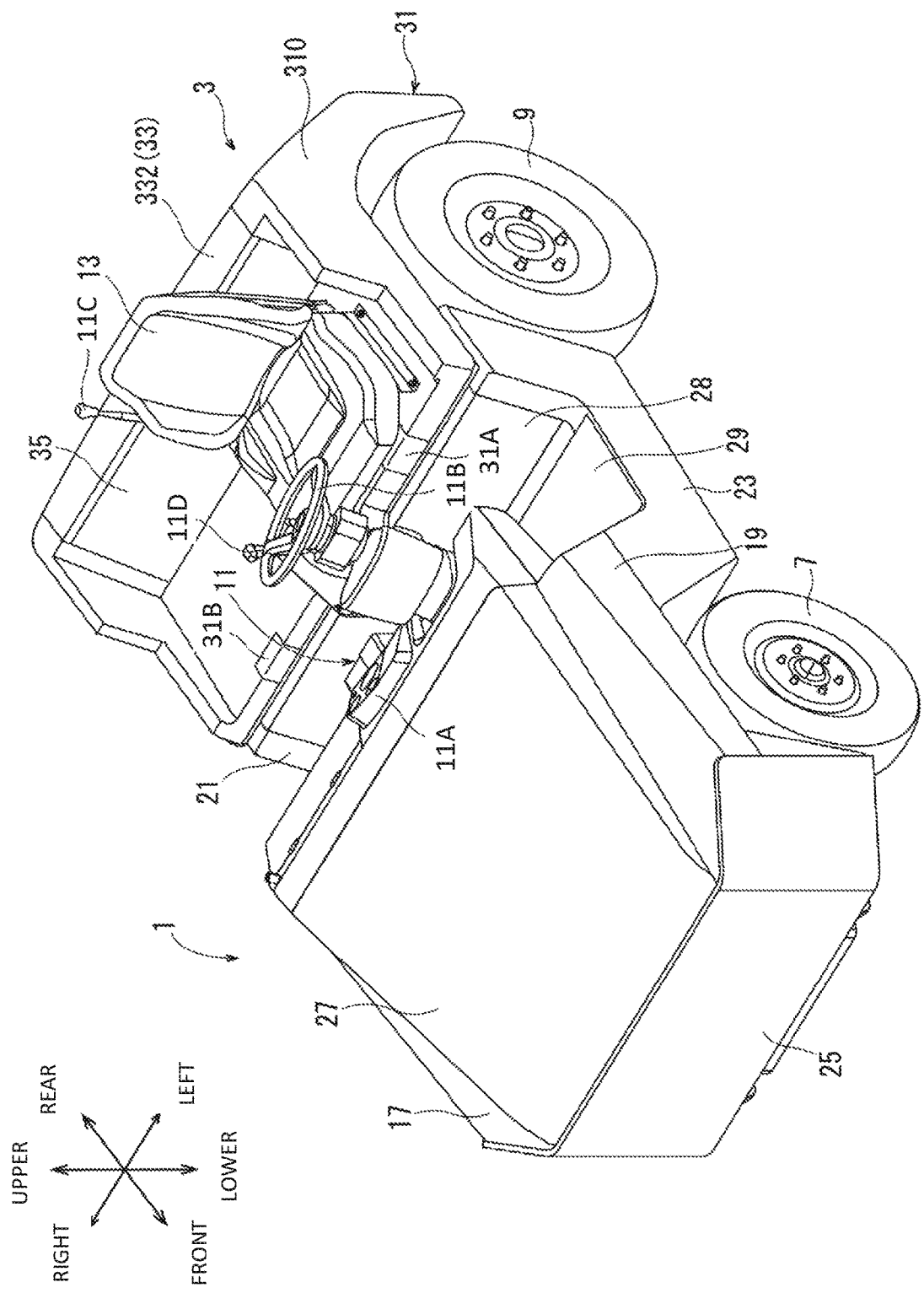
FIG. 1 is a perspective view of an industrial vehicle according to an embodiment of the present invention.
Figure 2:
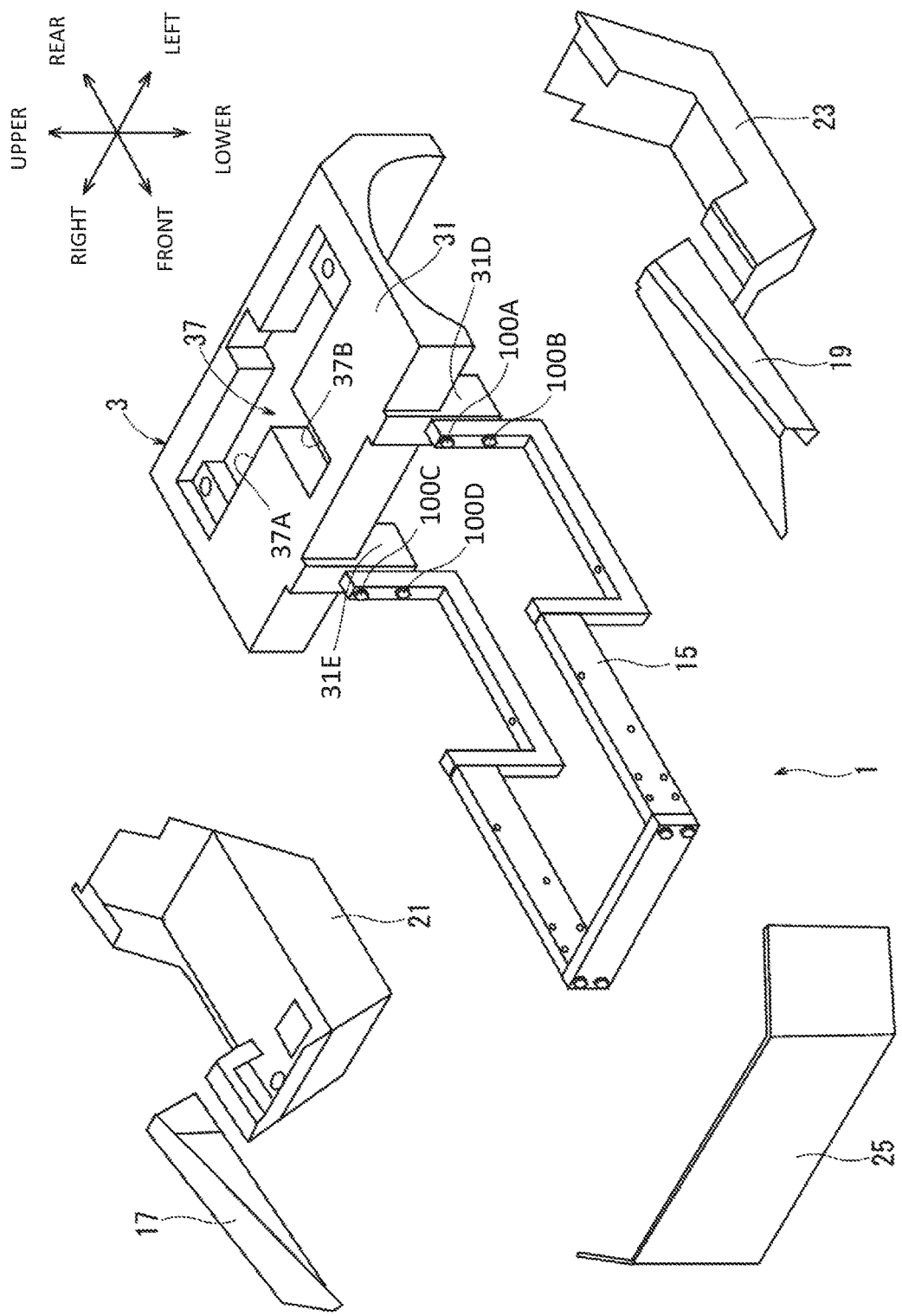
FIG. 2 is an exploded perspective view showing a frame, fender panels, a counterweight and so on of the industrial vehicle of FIG. 1.
Figure 3:
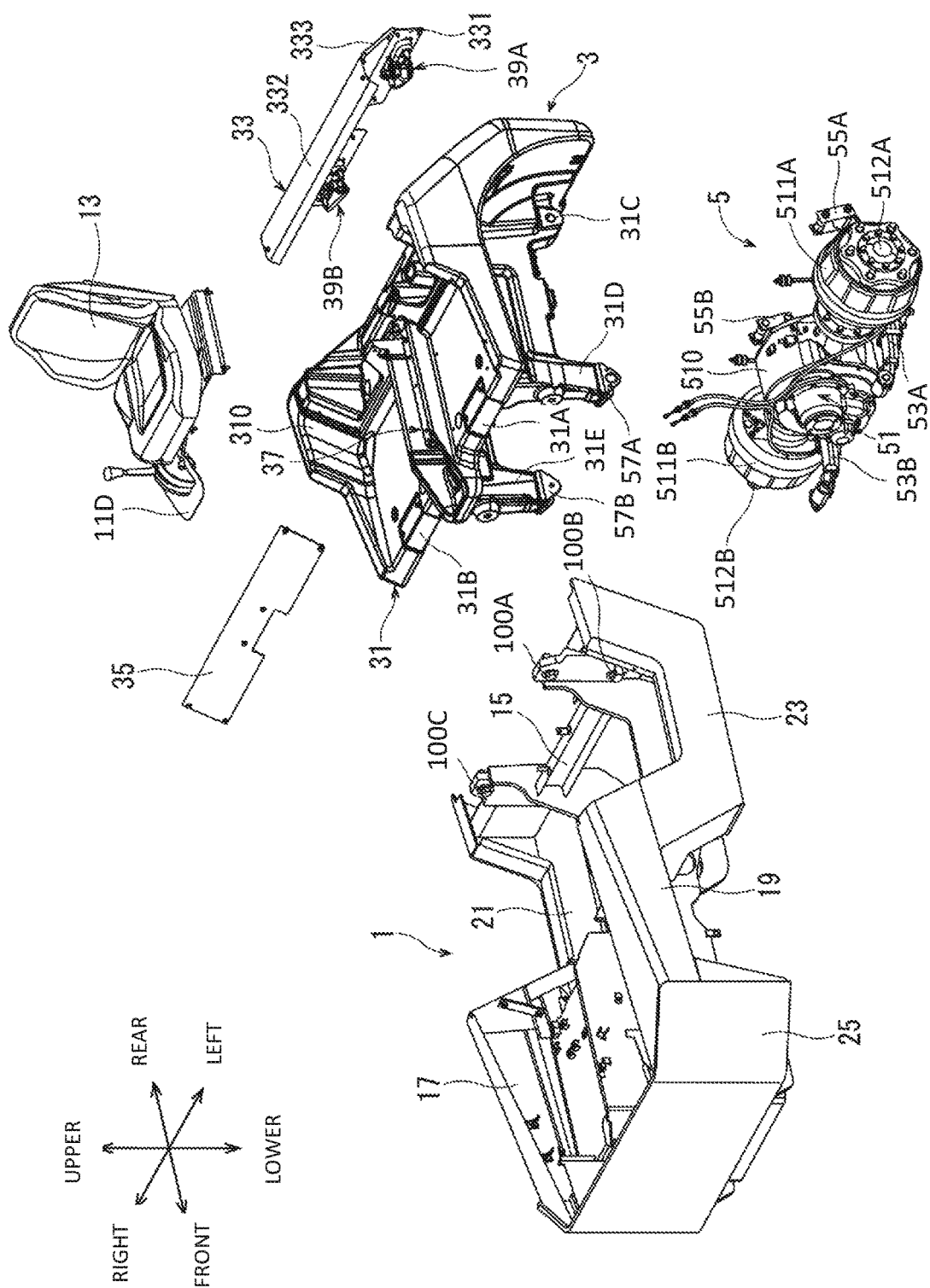
FIG. 3 is an exploded perspective view of the industrial vehicle of FIG. 1.

Referring to FIGS. 1 through 3, the towing tractor according to the present embodiment includes a vehicle body 1, a counterweight 3, a drive device 5, a pair of front wheels 7, a pair of rear wheels 9, a controller 11, and a driver seat 13. Three double-headed arrows in FIG. 1 indicate various positions and directions of the towing tractor. The upper and lower direction corresponds to the vertical direction of the present invention. In FIG. 1, only the left front wheel 7 and the left rear wheel 9 are shown and similar right front and rear wheels 7, 9 are provided on the opposite right side of the towing tractor. Regarding the positions and directions indicated by arrows in FIG. 1, the same is true for FIGS. 2 through 7.

Referring also to FIG. 2, the vehicle body 1 includes a frame 15, a right fender panel 17, a left fender panel 19, a fuel tank 21, a side panel 23, and a front guard 25. As shown in FIG. 1, the vehicle body 1 further includes a hood 27, a center panel 28, a floor panel 29, the front wheels 7, an engine (not shown), and a transmission (not shown).

As shown in FIG. 2, the frame 15 is formed of a plurality of long steel parts connected together into a frame shape extending in the front and rear direction of the towing tractor. The frame 15 is disposed at a lower position of the vehicle body 1 and supports the engine and the transmission. It is noted that according to the present invention the engine may be replaced with an electric motor. For the sake of the description, the frame 15 and the counterweight 3 are shown in FIG. 2 in a simplified form.

As shown in FIG. 2, the right fender panel 17 is mounted to the right front part of the frame 15 and the left fender panel 19 is mounted to the left front part of the frame 15, respectively. The fuel tank 21 is mounted to the right part of the frame 15 and located in the rear part of the right fender panel 17. The side panel 23 is mounted to the left part of the frame 15 at a position rearward of the left fender panel 19. The front guard 25 is mounted to the frame 15 at the front end thereof. As shown in FIG. 1, the hood 27 is mounted between the right fender panel 17 and the left fender panel 19. The center panel 28 and the floor panel 29 are mounted between the fuel tank 21 and the side panel 23.

The front wheels 7 are disposed below the left fender panel 19 and the right fender panel 17, respectively, and supported by the frame 15.

Figure 4:
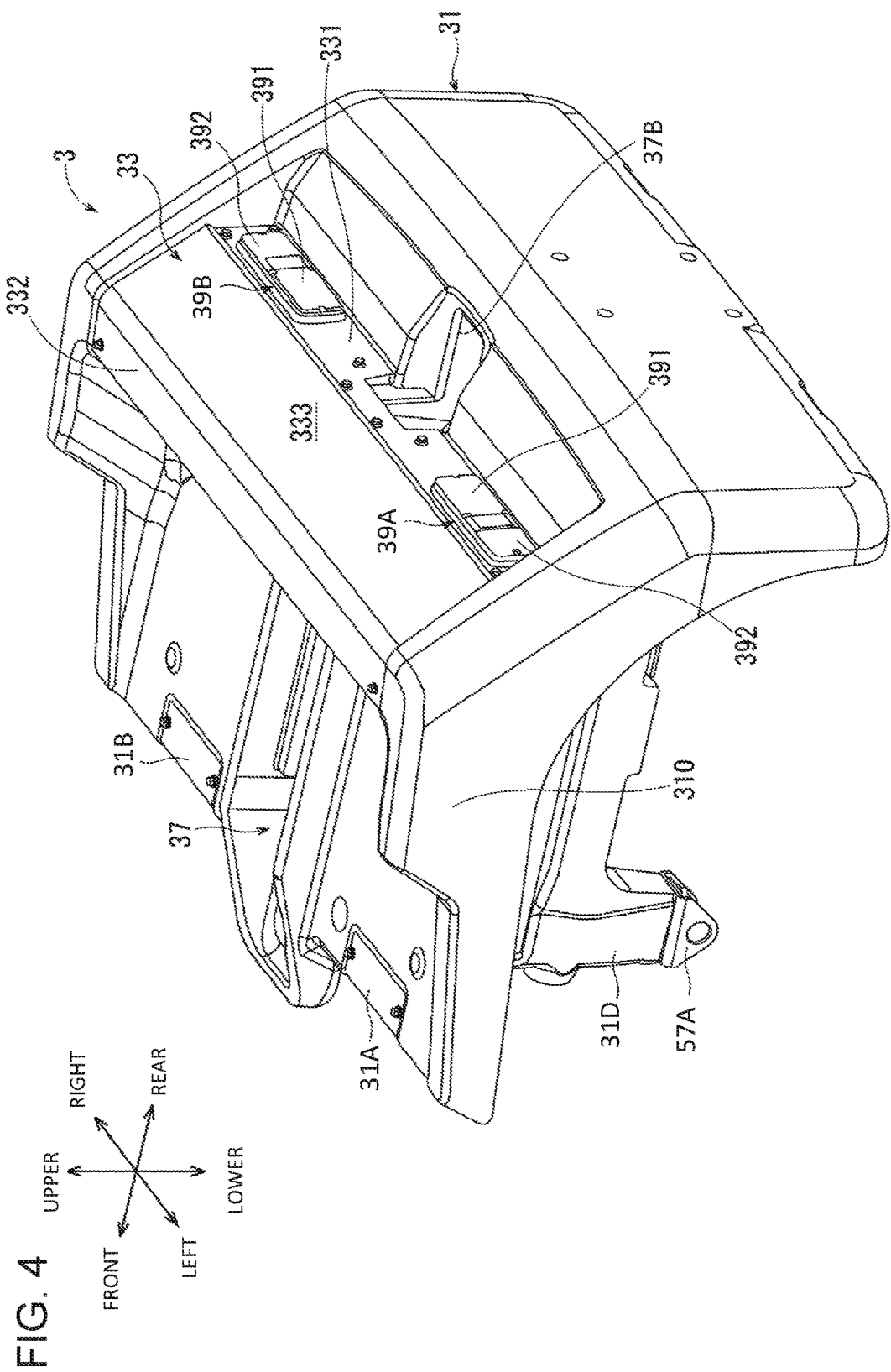
FIG. 4 is a perspective view of the counterweight of the industrial vehicle of FIG. 1.
Figure 5:
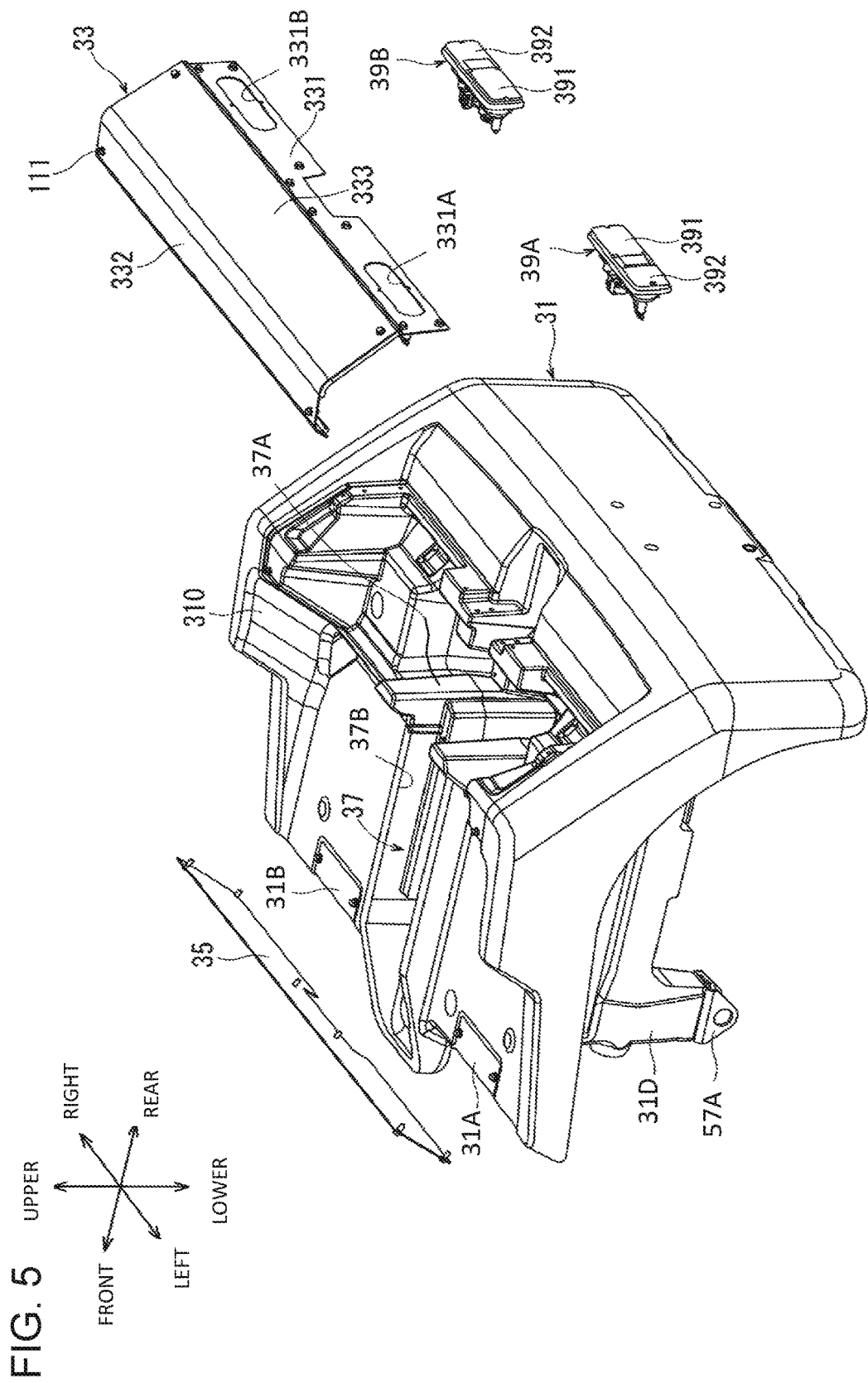
FIG. 5 is an exploded perspective view of the counterweight of the industrial vehicle of FIG. 1.

As shown in FIGS. 4 and 5, the counterweight 3 includes a counterweight body 31, a first cover 33, and a second cover 35. The first and the second covers 33, 35 correspond to the cover of the present invention.

The counterweight body 31 is formed of a single part made of casting. As shown in FIG. 2, the counterweight body 31 is fastened at the front end thereof to the rear end of the frame 15 by bolts 100A, 100B, 100C, 100D. Thus, the counterweight 3 of the towing tractor according to the present embodiment is connected to the frame 15.

Figure 6:
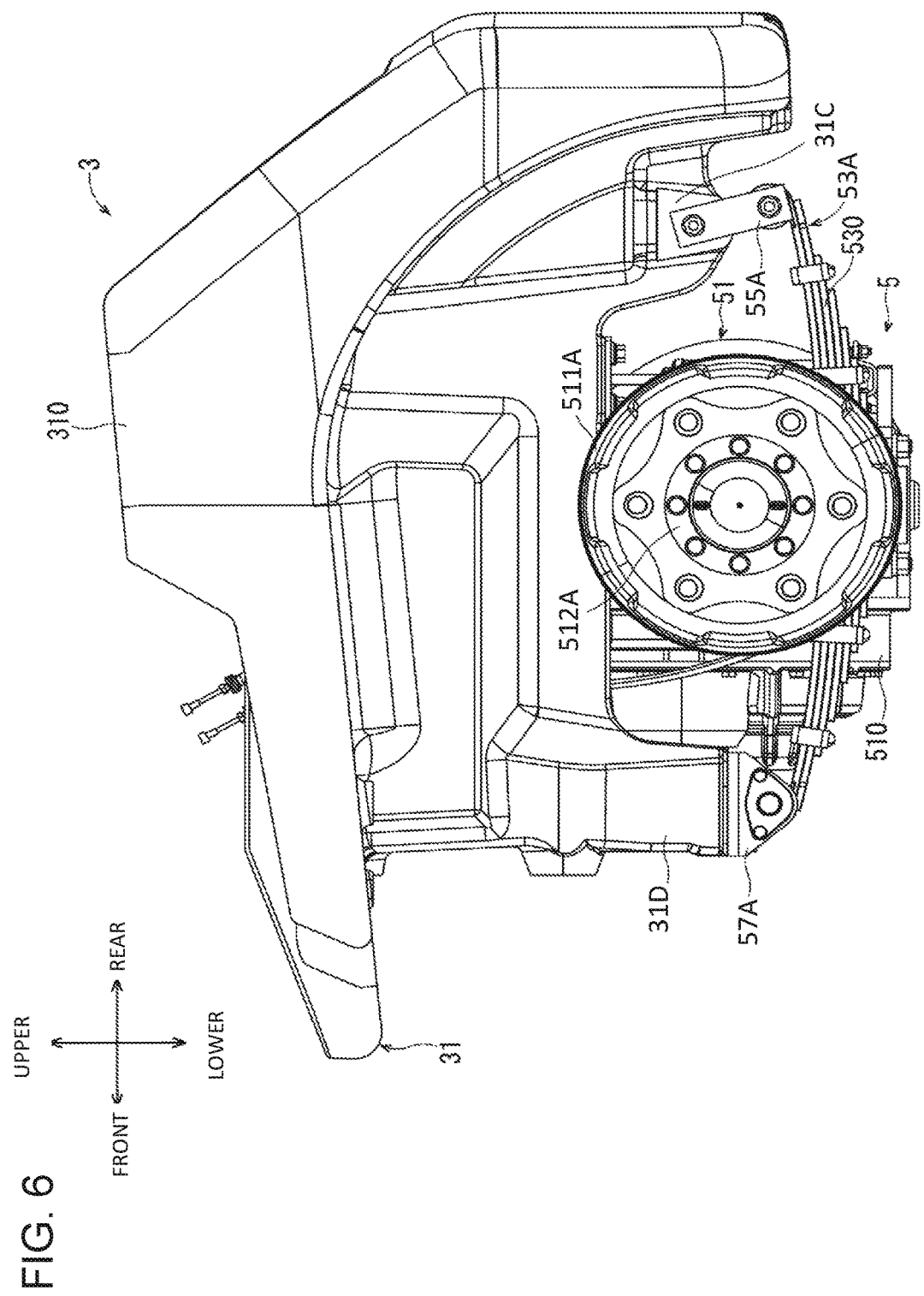
FIG. 6 is a left side view showing a drive device of the industrial vehicle of FIG. 1 that is mounted to the counterweight.

As shown in FIG. 4, bank portions 310 are formed in the rear part of and on opposite sides of the counterweight body 31, extending upward. As shown in FIG. 6, the rear part of each bank portion 310 is inclined downward and rearward.

As shown in FIG. 1, the driver seat 13 is mounted to the front left part of the counterweight body 31. Although not shown in the drawing, a drawbar device is provided at the bottom of the rear end part of the counterweight body 31 to connect the towing tractor with a cargo truck.

A first bolt cover 31A and a second bolt cover 31B are mounted to the front end of the counterweight body 31. Specifically, as shown in FIG. 4, the first bolt cover 31A is mounted to the left front end of the counterweight body 31 to cover and conceal the bolt 100A shown in FIG. 2, and the second bolt cover 31B is mounted to the right front end of the counterweight body 31 to cover and conceal the bolt 100C shown in FIG. 2.

As shown in FIG. 3, a first mounting portion 31C is formed at a lower position on the rear left side of the counterweight body 31. Although not shown in the drawing, a second mounting portion is formed at a lower position on the rear right side of the counterweight body 31. The counterweight body 31 has at a lower position on the front left side thereof a left leg portion 31D that extends downward. The counterweight body 31 has at a lower position on the front right side thereof a right leg portion 31E that extends downward. As shown in FIG. 3, a bracket 57A is mounted to the lower end of the left leg portion 31D by a bolt (not shown) and a bracket 57B is mounted to the lower end of the right leg portion 31E by a bolt (not shown).

Figure 7:
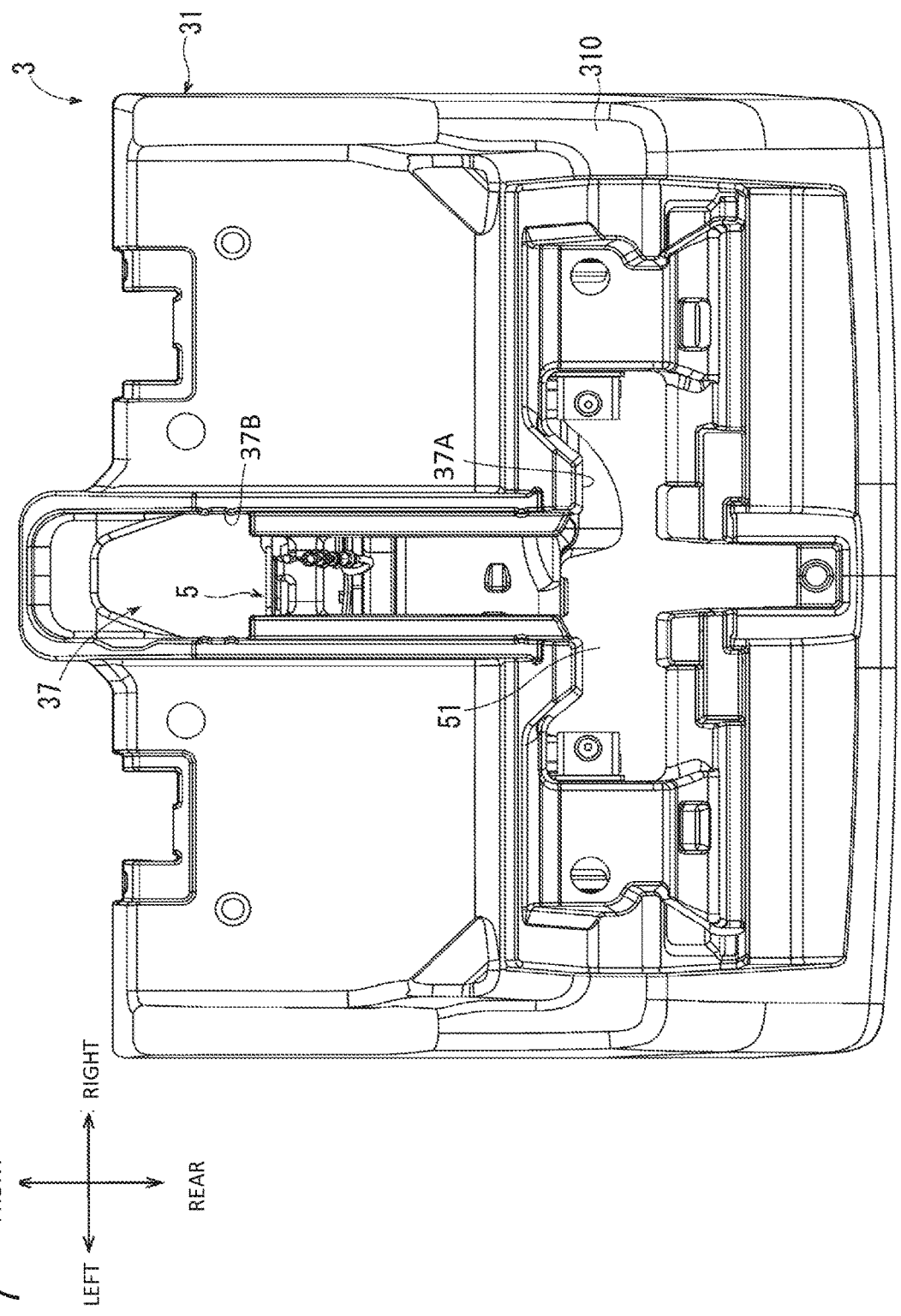
FIG. 7 is a top view of the counterweight showing the drive device mounted to the counterweight of the industrial vehicle of FIG. 1.

As shown in FIG. 7, the counterweight body 31 has therein an opening 37 extending in the upper and lower direction. The opening 37 has a center portion 37A that extends in the left and right direction in the bank portion 310 and a linear portion 37B that is formed continuously with the center portion 37A and extends straight from the rear end toward the front end of the counterweight body 31. The opening 37 is substantially of a crisscross shape. The shape of the opening 37 may be changed according to design requirement.

As shown in FIG. 5, the first cover 33 is made of a pressed metal plate. The first cover 33 has a vertical portion 331 that is located on the lower side of the first cover 33 and extends substantially in the upper and lower direction, a horizontal portion 332 that is located on the upper side of the first cover 33 and extends horizontally in the front and rear direction of the first cover 33, and a connecting portion 333 that is continuously connected to the vertical portion 331 and the horizontal portion 332. The connecting portion 333 is inclined from the horizontal portion 332 downward toward the vertical portion 331 along the rear shape of the bank portion 310.

A pair of fitting holes 331A and 331B is formed through the vertical portion 331 of the first cover 33 on the left and right sides thereof. A tail lamp 39A and a tail lamp 39B are mounted in the fitting holes 331A, 331B, respectively. Each of the tail lamps 39A, 39B is a combination lamp of a brake lamp 391 and a direction indicator lamp 392.

The second cover 35 shown in FIG. 3 is also formed of a pressed metal plate. The second cover 35 is formed flat and extends in the left and right direction. The shapes of the first and the second covers 33, 35 may be changed according to design requirement. Additionally, the first and the second covers 33, 35 may be made of a resin.

As shown in FIG. 4, the first cover 33 is mounted to the bank portion 310 of the counterweight body 31 at the rear thereof by a plurality of bolts (not shown). As shown in FIG. 1, the second cover 35 is mounted to the bank portion 310 at the front thereof by a plurality of bolts (not shown). Thus, the first and the second covers 33, 35 cooperate to form the outer shape of the bank portion 310 and cover the center portion 37A of the opening 37. With the first and the second covers 33, 35 thus mounted to the counterweight body 31, the rear end of the linear portion 37B of the opening 37 is exposed outside, as shown in FIG. 4. With the first cover 33 mounted to the rear side of the bank portion 310, the tail lamps 39A, 39B are disposed at the rear of the counterweight 3.

As shown in FIG. 3, the drive device 5 includes a rear axle 51, leaf spring suspensions 53A, 53B that are provided on the left and right sides of the rear axle 51, respectively, as a shock absorber. Any other shock absorbing member may be used as the shock absorber for the leaf spring suspensions 53A, 53B.

The rear axle 51 includes a differential gear (not shown) that is housed in an axle case 510, an axle shaft, and drum brakes 511A, 511B and hubs 512A, 512B that are provided on the left and right sides of an axle shaft, respectively. The axle case 510 has an oil port hole (not shown).

The rear axle 51 is connected to the engine through the transmission that transmits the drive force of the engine to the rear wheels 9 (FIG. 1) that are mounted to the rear axle 51 through the respective hubs 512A, 512B. Thus, the rear axle 51 drives the rear wheels 9 so that the towing tractor travels.

As shown in FIG. 6, each of the leaf spring suspension 53A, 53B is made of laminated leaf springs 530 and disposed extending in the front and rear direction. The leaf spring suspension 53A is mounted at the rear end thereof to the first mounting portion 31C of the counterweight body 31 through the bracket 55A and at the front end thereof to the left leg portion 31D of the counterweight body 31 through the bracket 57A. The leaf spring suspension 53B (FIG. 3) is mounted at the rear end thereof to the second mounting portion (not shown) of the counterweight body 31 through the bracket 55B and at the front end thereof to the right leg portion 31E of the counterweight body 31 through the bracket 57B. Thus, the leaf spring suspensions 53A, 53B are mounted to the left and right lower parts of the counterweight body 31, and the drive device 5 is mounted to the counterweight body 31 in a lower part thereof through the leaf spring suspensions 53A, 53B.

Referring to FIG. 1, the controller 11 shown in FIG. 1 includes an instrument panel 11A, a steering wheel 11B, a drawbar lever 11C, and an operation control lever unit 11D (FIG. 3). The instrument panel 11A and the steering wheel 11B are mounted to the vehicle body 1. The drawbar lever 11C is mounted to the rear part of the counterweight body 31 and operatively connected to the drawbar device. As shown in FIG. 3, the operation control lever unit 11D is mounted to the counterweight body 31 at a position on the right side of the driver seat 13 so as to cover the front end of the linear portion 37B of the opening 37.

In the towing tractor according to the present embodiment described above in which the drive device 5 is mounted to be disposed in a lower part of the counterweight body 31 through the leaf spring suspensions 53A, 53B, a part of the rear axle 51, or a part of the axle case 510 is disposed immediately below the opening 37 as apparent from FIG. 7 showing the top view of the counterweight 3, or when the counterweight 3 and the drive device 5 are viewed from above. Thus, in the towing tractor according to the present embodiment, removing the first and the second covers 33, 35 from the counterweight body 31 permits access to the rear axle 51, so that maintenance work of the towing tractor such as oiling and checking for the rear axle 51 can be performed without separating the counterweight body 31 from the drive device 5.

Accordingly, the towing tractor according to the present embodiment facilitates the maintenance work of the rear axle 51.

In the towing tractor according to the present embodiment in which the drive device 5 is mounted to the counterweight body 31 at lower parts thereof through the leaf spring suspensions 53A, 53B, the towing tractor dispenses with additional mounting for mounting the drive device 5 to the frame 15. Therefore, the frame 15 of the towing tractor according to the present embodiment may be made simpler in structure and manufacturing cost is reduced, accordingly. Since no part of the frame 15 is present between the counterweight body 31 and the drive device 5, maintenance work of the rear axle 51 may be performed easily. The drive device 5 may be mounted to the counterweight body 31 through the opening 37, which facilitates the mounting work.

In the towing tractor according to the present embodiment, in which the counterweight 3 includes the counterweight body 31, the first cover 33, and the second cover 35 and the counterweight body 31 is formed of a single part made by casting. Thus, in the towing tractor according to the present embodiment, the counterweight body 31 does not need to be formed of a combination of parts, so that a plurality of molds does not need to be used for casting of the counterweight body.

In the structure of the counterweight 3 in which the tail lamps 39A, 39B are mounted to the first cover 33 that is a part different from the counterweight body 31, no core is used in the casting of the counterweight body 31 for forming a hollow space for the tail lamps 39A, 39B, so that the counterweight body 31 may be made easily and hence with reduced cost.

The first and the second covers 33, 35 that are formed of a pressed metal plate are easy to be made. Additionally, the first and the second covers 33, 35 may be made light in weight, so that the first and the second covers 33, 35 may be removed easily from the counterweight body 31 in the maintenance of the rear axle 51.

In the towing tractor according to the present embodiment in which the tail lamps 39A, 39B are mounted to the first cover 33, mounting work of the tail lamps 39A, 39B may be easily performed as compared to a structure in which the tail lamps 39A, 39B are directly mounted to a cast counterweight body. In the towing tractor according to the present embodiment, any other parts or devices other than the tail lamps 39A, 39B such as a working light, tools, and safety instrument may be mounted to the first and the second covers 33, 35. In this case, such additional parts and devices can be mounted easily to the first and the second covers 33, 35 that are formed of a metal plate.

The present invention is not limited to the above-described embodiment, but may be practiced variously as exemplified below within the scope of the invention.

Although a towing tractor has been described as the industrial vehicle in the above embodiment, the industrial vehicle includes a forklift truck.

The frame 15 may be provided with mountings to which the leaf spring suspensions 53A, 53B are mounted so that the drive device 5 is mounted to the rear part of the frame 15.

The counterweight body 31 may be formed of a combination of parts.

The present invention is applicable to an industrial vehicle such as a towing tractor and a forklift truck.

What is claimed is:

1. An industrial vehicle comprising:
   a frame;
   a counterweight connected to a rear part of the frame;
   a rear axle disposed below the counterweight to drive rear wheels; and
   a driver seat mounted to the counterweight,
   wherein the counterweight has an opening extending in a vertical direction, wherein at least part of the rear axle is disposed immediately below the opening,
   wherein the counterweight comprises a counterweight body having the opening and a cover mounted to the counterweight body to cover the opening, wherein the counterweight body is formed of a single part, wherein a tail lamp is mounted to the cover, and
   wherein the opening has a linear portion extending in a front and rear direction and a center portion formed continuously with the linear portion at a rear part of the driver seat and extending in a left and right direction perpendicular to the front and rear direction.

2. The industrial vehicle according to claim 1, wherein the rear axle is mounted to the counterweight.

3. The industrial vehicle according to claim 1, wherein the cover is formed of a plate.

4. The industrial vehicle according to claim 1,
   wherein a width of the center portion in the left and right direction is wider than a width of the linear portion in the left and right direction.

5. The industrial vehicle according to claim 1, wherein the rear axle comprises an axle case, an axle shaft, a differential gear, a brake, and hubs.

6. The industrial vehicle according to claim 1, wherein at least the rear axle is accessible via the opening.

* * * * *